United States Patent [19]
Royle

[11] Patent Number: 5,743,690
[45] Date of Patent: Apr. 28, 1998

[54] SELF-LOCKING TUBULAR FASTENER AND FASTENER SYSTEM

[76] Inventor: Ian A. Royle, 10323 Huntington Place Dr., Houston, Tex. 77099

[21] Appl. No.: 702,241

[22] Filed: Aug. 27, 1996

Related U.S. Application Data

[63] Continuation-in-part of Ser. No. 367,738, Jan. 3, 1995, Pat. No. 5,549,431.

[51] Int. Cl.[6] .................. F16B 37/12; F16B 39/284; F16B 25/00
[52] U.S. Cl. .................. 411/178; 411/306; 411/387; 411/403
[58] Field of Search .................. 411/178, 306, 411/324, 386, 387, 395, 424, 418, 420, 421, 403, 404

[56] References Cited

U.S. PATENT DOCUMENTS

| | | | |
|---|---|---|---|
| 1,874,389 | 8/1932 | Trotter | 411/306 |
| 1,874,657 | 8/1932 | Trotter | 411/306 |
| 5,160,225 | 11/1992 | Chern | 411/387 X |
| 5,169,270 | 12/1992 | Erickson | 411/324 X |
| 5,449,257 | 9/1995 | Giannuzzi | 411/387 X |
| 5,482,417 | 1/1996 | Erickson | 411/324 X |
| 5,529,449 | 6/1996 | McSherry et al. | 411/387 X |
| 5,536,121 | 7/1996 | McSherry | 411/387 X |

Primary Examiner—Neill R. Wilson
Attorney, Agent, or Firm—Thomas A. Kahrl, Esq.

[57] ABSTRACT

A threaded self-locking fastener, having a hollow body open at both ends and an elongated central through bore with a slot extending the length of the hollow body.

Version 1 has sharp edges on the slot that dig into the bore of the work piece to prevent rotation. The fastener is used in conjunction with an internal driver. The driver located in the bore of the fastener engages detents to produce rotary drive motion. The driver also has a means of manipulating the first and second edges to facilitate assembly and disassembly.

Version 2 has curved or chamfered edges in the slot and inward facing lobes also used in association with a driver. Rotation of the driver against the lobes causes the tubular fastener to be reduced in diameter against spring tension thereby allowing the fastener to freely rotate in the threaded bore of the work piece. By releasing the driver, the fastener expands and self locks in the threaded bore.

Version 3 has a sharp edge on one side of the slot and a curved lobe on the other and is spring tensioned to cause the sharp edge to dig-in and prevent counter-clockwise rotation. The driver located in the bore of the fastener engages a detent causing the fastener to be reduced in diameter against spring tension when the driver is rotated clockwise. By releasing the driver's rotation, the fastener expands and causes the sharp trailing edge to dig-in to prevent counter-clockwise rotation of the fastener in the threaded bore of the work piece.

7 Claims, 6 Drawing Sheets

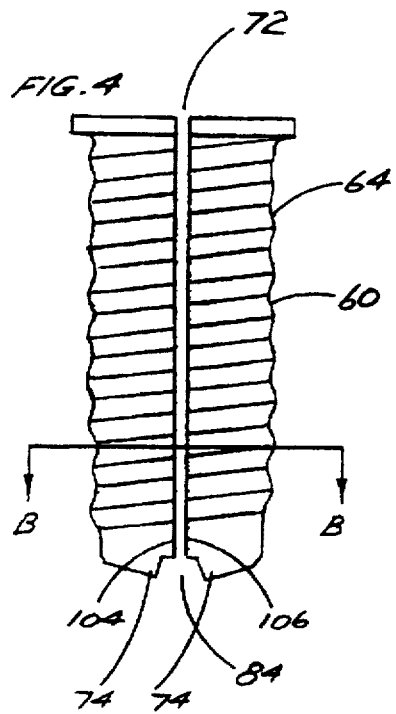
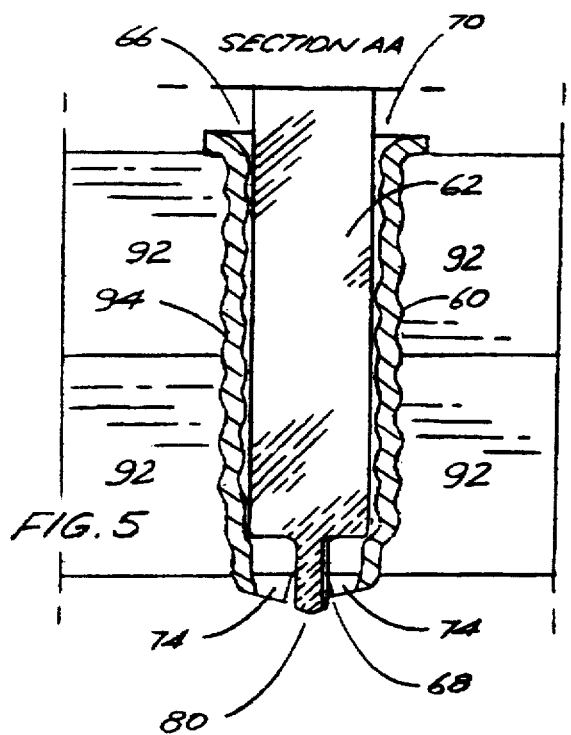
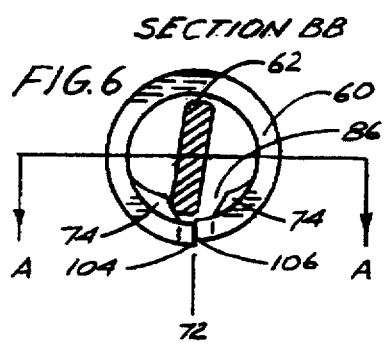
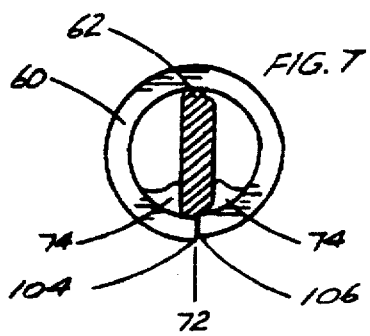
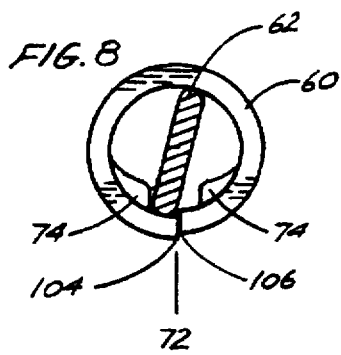
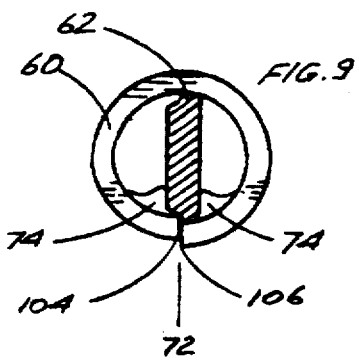

SECTION AA 5,743,690

SELF-LOCKING TUBULAR FASTENER AND FASTENER SYSTEM

CROSS REFERENCE TO RELATED APPLICATIONS

This application is a continuation-in-part of U.S. patent application Ser. No. 08/367,738 filed Jan. 3, 1995, now U.S. Pat. No. 5,549,431 having an issue date of Aug. 27, 1996 entitled TUBE SCREW FASTENER in the name of Ian A. Royle. In the original, parent application the invention is directed to a threaded tubular fastener having an elongated central through-bore having an engaging apparatus for engaging said through-bore with a rotary device having a rotary driver, the fastener having a generally hollow cylindrical body having an external thread from thereon, said thread being larger than the diameter of a predrilled hole in a first work piece and a second mating work piece wherein said threaded tubular fastener is employed to fasten the first work piece to the second work piece. In the present invention the hollow-tubular fastener is slotted to provide a self locking feature. The first work piece and second work piece shall mean two pieces to be fastened together to make an assembly.

BACKGROUND OF THE INVENTION

Fasteners for attaching a first work piece to a second work piece are typically expensive as a result of the demands for lightweight, high-strength fasteners sought by the construction and airline industry. Current requirements for fasteners put a premium on ease of installation combined with speed of application with associated reduction in cost of application.

Fastening systems traditionally have included a fastening device having a head, a driver for driving the head of the fastening device, and apertures in the structure members to be joined together. In particular, with respect to threaded fasteners, the fastener typically includes a threaded portion which may be tapered or cylindrical, and a head portion at one end adapted to receive a screwdriver. The head may be externally slotted, as with the slotted head of a conventional wood screw, or alternatively internally recessed, such as a recess for an Allen wrench; it may be single-slotted, such as the conventional screw, or multi-slotted, such as the Phillips screws, and all such heads of fasteners as installed, commonly protrude above the surface of the work piece.

PRIOR ART

Prior art drivers have typically included the traditional screwdriver with a single blade, a Phillips-head screwdriver having a pointed, X-shaped head, or an Allen wrench having an hexagon-shaped bar with a short portion and an elongated portion, either portion being adapted for use as a driver or a handle member. Prior art conventional Slotted Head Screws, for use with wood or drywall traditionally have tapered thread portions which are adapted, inserted and tapered apertures drilled in the structure member. In the event that the tapered aperture drilled in the structure member is too small for the threads of the slotted head screw, the slotted head screw will seize up part way in the hole, often resulting in scoring of the slotted head. In this situation the screw must be removed by special procedures as the head is destroyed, leaving an imperfect and unsightly appearance. Furthermore, conventional slotted-head screws can only accept a limited amount of force applied to the driving head prior to failure of the driving head, this excludes their applicability in high-strength fastening applications. Also, slotted head screws having a solid cross section are relatively heavy, particularly when constructed of brass for use in corrosive environments, and are expensive due to the cost of brass material.

Furthermore, all fasteners having an external head suffer a difficulty in that the head is left exposed and protruding upon completion of driving the fastener in place. In order to conceal such fasteners, it is necessary to countersink the aperture to accept the external head in a recess and to provide a plug device superimposed over the external head to conceal it from view. Such countersinking and plugging is time consuming and expensive and very often yields an unsatisfactory exterior appearance.

The Phillips-head fastener was one element of a fastening system originally designed for high-speed production techniques in applications with associated Phillips power drivers. The X-shaped, pointed head provided for ease of location of the driver in the fastener head and provided greater force to be applied to the fastener. While Phillips-head drivers permitted increased speed of application by providing a larger contact area on the head for the applying force of the driver, it was common, once the fastener seated, for the head to slip and strip the cross-slotted head making removal of the fastener difficult, if not impossible. The alternative Allen fastening system was developed for providing greater force-applying means to the driving head by providing a recessed socket for accepting a multi-faceted rod, typically having a hexagonal shape. The Allen threading fastening system is typically used in metallic applications such as lock nuts or key systems. The Allen fasteners, in a solid cross section, were typically for machine threads which are expensive to produce and conventionally have not been used in the construction industry due to their cost of manufacture and due to the fact that they require greater time in the application.

Fasteners employed in the assembly of electronic components are typically of the Slotted Head and Phillips configuration and have no self locking feature. Accordingly, such components frequently suffer from defects resulting from loose connections and loose fasteners which may cause shorts or other equipment failure.

Applicant is aware of U.S. Pat. No. 4,856,953 issued on Aug. 15, 1989 to LIN for a Hook-Driven Screw with Replaceable Hook Apparatus. This invention is directed to a combination of a screw and a hook and includes a screw fixed on a wall having a pair of longitudinal grooves formed in a cylindrical hole in the screw, and a hook having a cylindrical shank with a pair of longitudinal extensions engageable with the two longitudinal grooves in the screw, so that a hook inserted in the screw may be replaced with another new hook or different shaped hook. LIN discloses a screw having a pointed end and flanged head, does not employ a self locking feature and does not feature joining a first work piece to a second work piece. Rather LIN discloses a means for anchoring a hook in a wall.

Another fastener device is disclosed in U.S. Pat. No. 4,462,283 issued on Jul. 31, 1984 to ITO for a screwdriver apparatus for screwing a threaded fastener into an internally threaded member having a casing from a through-bore to receive the threaded fastener said being patented to ITO. Unlike applicant's device, ITO does not include an internal engaging device formed on the walls of the fastener.

Unlike the prior devices applicant's device is configured as a self-locking fastener, having a hollow body open at both ends and an elongated central through bore with a slot extending the length of the hollow body having raised edges for locking and a driver that manipulates the locking edges for assembly and disassembly such that when the fastener is threaded into apertures provided in one or more work pieces, the raised edges engage the wall of the bore to lock the fastener in place. By reversing the driver and turning the driver in a counter-clockwise direction one edge is lowered to permit the fastener to be removed since the self locking feature is now disengaged.

A further embodiment of the invention that provides improvements over prior devices, is a lobed tubular fastener, having a hollow body open at both ends and an elongated central through-bore with a slot extending the length of the hollow body having two edges that turn inwards to form driving lobes and having a spring action causing expansion of the fastener inside the bore hole of the work piece providing a self locking action. A driver is inserted inside the fastener and rotates the fastener when tightening or loosening the fastener. When driving rotation is stopped or the driver is removed, the fastener through spring action, expands in the work piece, thereby providing a self locking action in both directions.

Accordingly, it is desirable to provide for a new and improved tubular fastener and internal fastening system to provide for lightweight, hollow, high-strength and high-quality fasteners which are self locking and overcome at least some of the disadvantages of prior art fasteners and systems.

SUMMARY OF THE INVENTION

The parent invention relates to a threaded tubular fastener apparatus and fastener system and method for screwing a hollow, headless tubular fastener for connecting two work pieces together. As installed, the headless tubular fastener is flush-mounted with the exterior surface of the work pieces for an enhanced appearance. The threaded tubular fastening apparatus includes a hollow tubular fastener member, a rotary driver having a shank, including an axial interconnecting means for interconnecting the threaded tubular fastener and the driving means for driving the tubular fastener into aligned openings in two work pieces for connecting the work pieces.

In the parent invention, the tubular fastener is adapted for mounting in aligned openings pre-drilled in two work pieces, typically aligned in parallel relationship for connecting the work pieces together. The openings are drilled with a conventional drill to provide for parallel walls. Tubular fasteners of cylindrical construction having a hollow casing such that the exterior wall of the tubular fastener is parallel with the walls of the openings. The tubular fastener includes an external thread provided on the tubular exterior of the tubular casing and includes external longitudinal slots and associated internal longitudinal ribs extending the entire length of the fastener, wherein the threads in the preferred embodiment are formed as rolled threads. Alternatively, the threads could be formed as cut threads. Tubular fasteners are provided with a through bore extending the entire length of the fastener to provide a hollow opening to permit the rotary driver to pass reciprocally through the tubular fastener to engage substantially the entire length of the internal slots.

The present invention is directed to an improved tubular fastener in combination with internal driver. In particular the present invention is directed to a threaded self-locking fastener, having a hollow body open at both ends and an elongated central through bore with a slot extending the length of the hollow body having raised edges such that when the fastener is threaded into apertures provided in one or more work pieces, the raised edges engage the wall of the bore to lock the fastener in place. By reversing the driver and turning the driver in a counter-clockwise direction one edge is lowered to permit the fastener to be removed since the self locking feature is now disengaged.

A further embodiment of the invention, that provides improvements over prior devices, is a lobed tubular fastener, having a hollow body open at both ends and an elongated central through bore with a slot extending the length of the hollow body having two edges that turn inwards to form driving lobes and having a spring action causing expansion of the fastener inside the bore hole of the work piece providing a self locking action. A driver is inserted inside the fastener and rotates the fastener when tightening or loosening the fastener by contacting the lobes. When driving rotation is stopped or the driver is removed, the fastener through spring action, expands in the work piece thereby providing a self locking action in both directions.

There are three embodiment tube fasteners and a drill driver.

In the first, the screw has a flanged top and the tubular body has a bent corner at the cutting edge to retain the drill driver. This screw is extremely cheap, as it is made of rolled strip. The thread form can be rolled (or pressed before rolling). The compression thread (similar to EDISON bulb thread) would be used on most tube fasteners for a better grip in soft materials. These threads can be roll formed or formed electromagnetically (EMF). Referring to FIG. 13, sharp narrow section thread lands 120 cause concentrated cutting areas on the sheet metal 135 or soft work piece 140 section allowing the fastener to shear the sheet metal 135 or soft work piece 140 one section at a time at low load but high concentration, thereby stripping the attached hole.

The tubular fastener has a smooth tube type thread 130 that causes a compression load to the whole circumference of the attachment hole thereby applying the load to the full circumference of the sheet metal 135 or soft work piece 140 and not to a concentrated shear load as in the present fastener with sharp narrow section thread lands.

In the second, a sheet metal thread screw would be typically used in sheet metal frames and is self drilling and self tapping.

A compression thread also can be drilled and tapped into steel being basically a slotted head screw replacement. This screw is suitable for plastics and light alloys.

The tube fasteners designed for drywall screw replacement, are smaller in diameter and of course shorter.

The drywall industry is using sheet metal frames in California and many other states and they require self locking screws. The drywall screw is a wrap up tube screw which is self drilling and self tapping. This version of the tube screw will lock and cannot be removed. A slotted driver causes the tube screw to be reduced in diameter during the self tapping process. When the drive is stopped, the diameter increases and the trailing edge will "dig-in" and prevent the screw loosening.

In a third embodiment, the tubular screw has a spring action causing expansion of the fastener inside the bore hole of the work piece and associated with a driver inserted inside the fastener to release the self locking feature during clockwise and counter-clockwise rotation of the driver. This fastener is useful in the electronic, instrument and aerospace industries for a self locking fastener that is easily assembled and removed without damage to the work piece.

Accordingly, it is an object of this invention to provide a stronger, lighter, self-locking fastening device for fastening a plurality of work pieces together.

It is another object of the invention to provide an inexpensive fastener of sheet metal, cast metal or plastic, sintered metal, ceramics and composites adapted to accept greater driving pressure due to the driving connection being made the entire length of the fastener to provide a high-strength fastener.

It is another object of the invention to provide a fastening device which provides for flush mounting and avoids the necessity of countersinking the fastener aperture.

A further object of the invention is to provide an internal driver that has positive drive interengaging means over the full length of tubular fastener.

It is a further object of the invention to provide a threaded bore for retention of bolt or stud or plug or assembly device in the bore of the inserted tubular screw.

It is a further object of the invention to provide the driver with an optional drill point to assist in self drilling and self tapping of the fastener lobes.

A further object of the invention is to eliminate an external head of the fastener.

It is a further object of the invention to provide a full depth internal drive for providing control-positive alignment of the fastening device.

It is a further object of the invention to provide a hollow fastener for movement of fluid through assemblies and for use as raceways.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 4 is a side elevational view of the self-locking tubular fastener according to the present invention.

FIG. 5 is a side elevational view of the self-locking tubular fastener shown in partial section and a driver according to the present invention.

FIG. 6 is an end sectional view of the combination self-locking tubular fastener illustrated in FIG. 5 in combination with driver showing drive lobes.

FIG. 7 is an end sectional view of the present invention shown in combination with a driver shown in a driving mode.

FIG. 8 is an end view of the tubular fastener illustrated in FIG. 4 shown in a driving mode.

FIG. 9 is an end view of the tubular fastener shown in an unscrewing mode. FIG. 7 and FIG. 9 show displacement of the lower edge from a lower position to an upper position.

FIG. 10 is deleted.

FIG. 11 is deleted.

DETAILED DESCRIPTION OF THE PREFERRED EMBODIMENT

Figure 1:
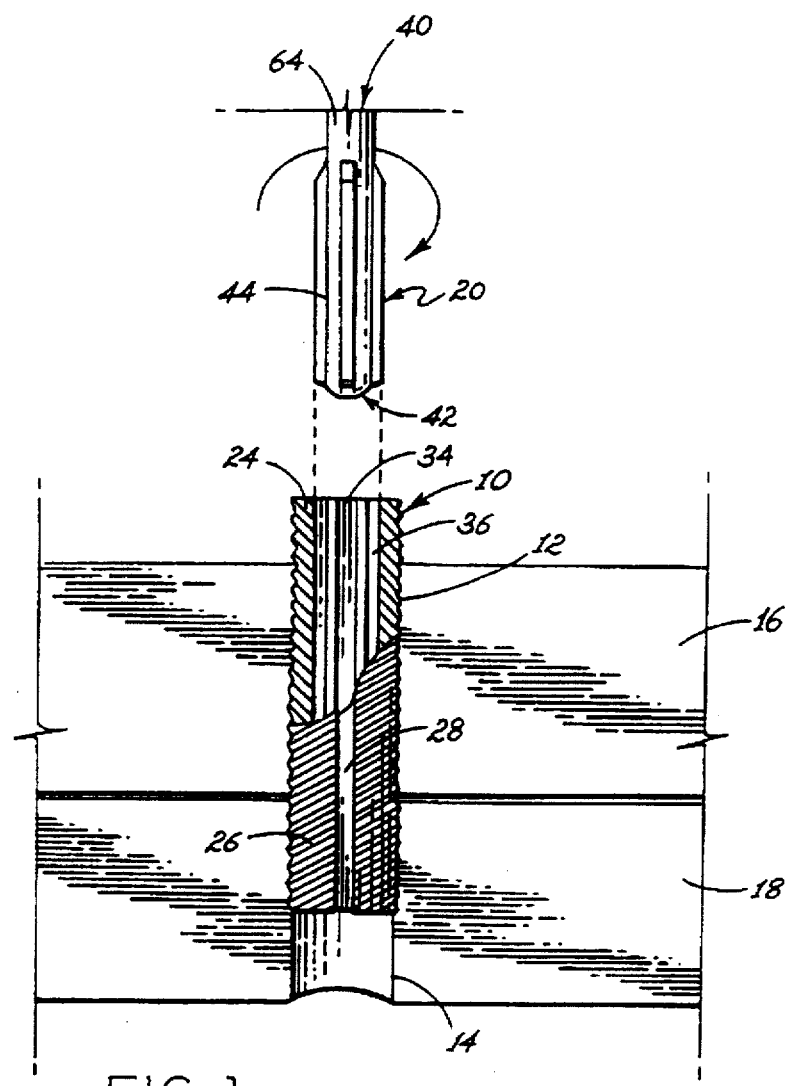
FIG. 1 is a side elevational view of the threaded tubular fastener shown in partial section and rotary driver according to the original invention.
Figure 2:
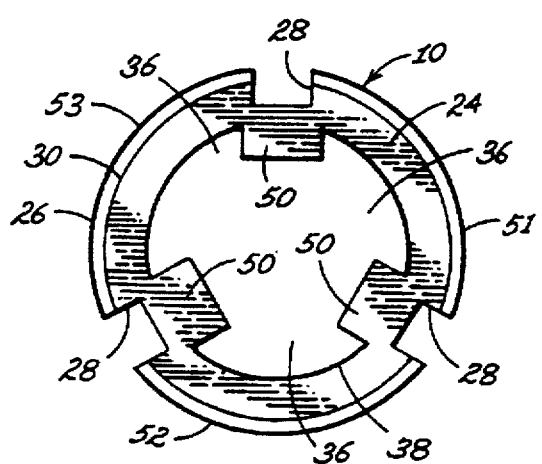
FIG. 2 is a cross sectional view of a tubular fastener of FIG. 1 illustrating the tubular fastener in a set condition in a first and second work piece of the original invention.
Figure 3:
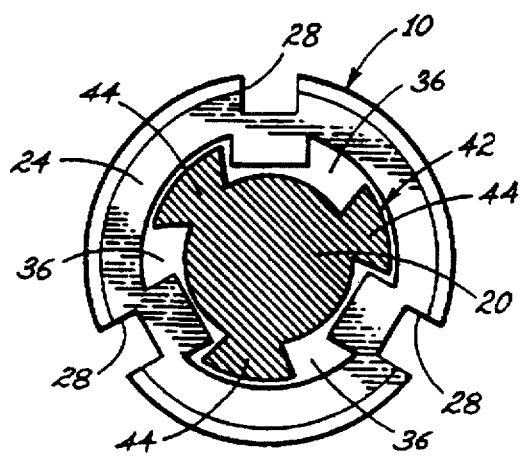
FIG. 3 is an end view of the tubular fastener illustrated in FIG. 1 of the original invention.

Referring to the FIGS. 1–3 of the original parent embodiment there is shown a threaded tubular fastener 10 for mounting in aligned apertures 12 & 14 in two work pieces 16 & 18 for connecting said work pieces in combination with a driver 20 configured to impart torque to said fastener. In particular the preferred embodiment is directed to a tubular fastener 10 for fastening a first work piece to a second work piece comprising a body 24 of tubular construction having a segmented thread 26 with a plurality of axial flutes 28 formed on the external surface 30 of said body. Preferably the threads are formed as rolled threads to be received in openings 12 & 14 in the work pieces 16 & 18 preformed in said work pieces.

In the parent embodiment the threaded tubular fastener 10 includes a central through-bore 34 having a plurality of axial slots 36 formed in an inner wall 38 of said through-bore. The tubular fastener cooperates with manually operated rotary driver 20 for manually threading said fastener into apertures of the first and second work pieces 16 & 18 which are adapted to transfer a substantial amount of force, without deformation in the threading of the tubular body 24, into the aperture work members 16 & 18. Said rotary driver includes a first end and a second end and includes a manual torque applying device 40 at the one end and an interengaging device 42 at the other end consisting of a plurality of axial ribs 44 for engagement with the axial slots 36 positioned in body 24 between internal ribs 50. Said through-bore 34 is adapted to permit the driver 20 to pass reciprocally through the threaded tubular fastener 10 to engage substantially the entire length of the internal ribs 50 for turning said tubular fastener in two axial directions; a first direction for threading tubular fastener 10 into aligned openings 12 & 14, the second for backing said tubular fastener out of said openings.

In the parent embodiment, the fastener 10 is adapted to be set by driver 20, said fastener consisting of an externally threaded tubular body 24 constructed of tubular casing threads 26 being formed as rolled threads to be received in apertures 12 & 14 and work pieces 16 & 18. The threads are formed as segmented threads 26 including a first thread section 51, a second thread section 52 and a third thread section 53. Driver 20 is configured to be manually operated in the parent embodiment to transfer a substantial amount of force through interengagement of axial ribs 44 and internal ribs 50 for driving fastener 10 into apertures 12 & 14 without deformation in segmented thread 26 of tubular body 24. Driver 20 has a first end and a second end.

Referring to FIGS. 4 through 9, in present invention there is shown an improved tubular fastener 60 in combination with an internal driver 62 in particular, the present invention is directed to a threaded self locking fastener 60 having a hollow body 64 open at both ends 66–68 and an elongated through bore 70 with a slot 72 extending the length of said hollow body. The slot produces two sharp edges 104, one of which digs into the surrounding work piece 92 in a clockwise direction and one 106 of which digs into the surrounding work piece 92 in a counter-clockwise direction.

Figure 12:
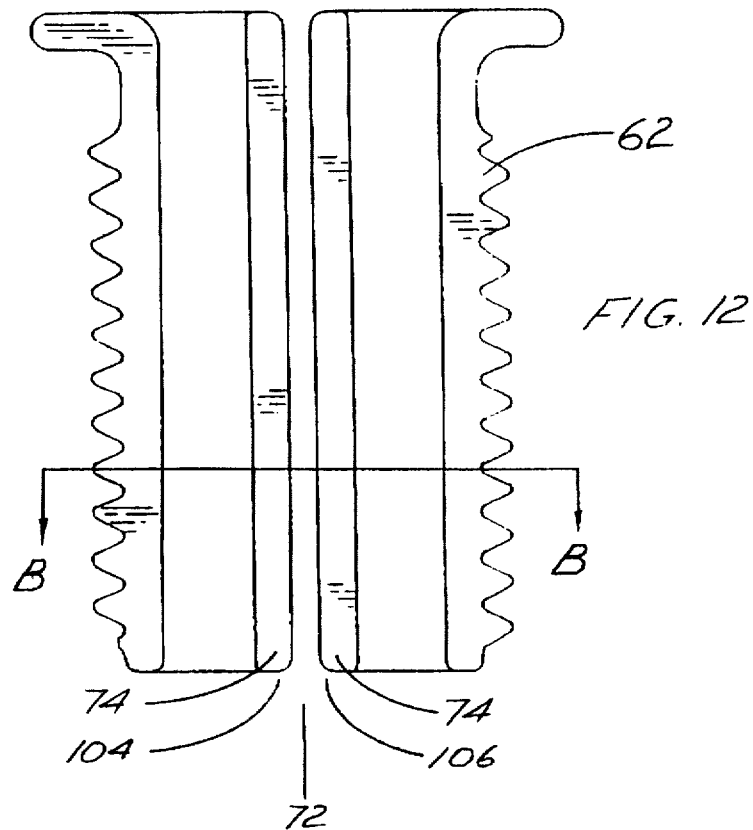
FIG. 12 is a further embodiment of the present invention showing a lobed driver with a spring action wherein the driver reduces the diameter of the fastener when tightening or loosening.
Figure 12A:
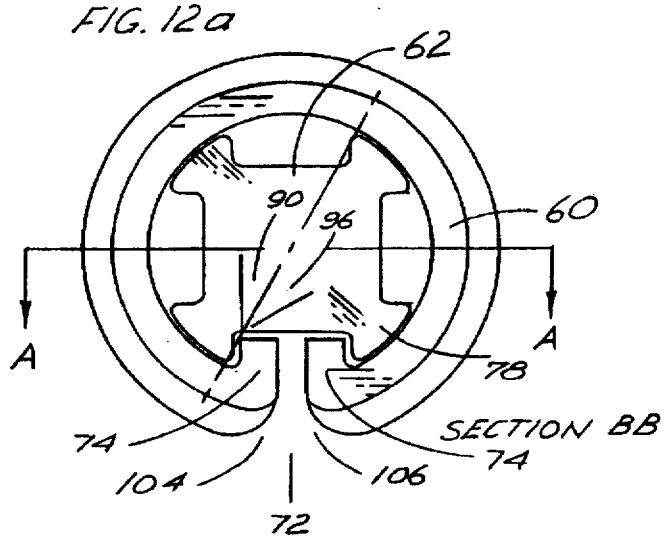
FIG. 12a is an end sectional view of the tubular fastener illustrated in FIG. 12 and shows a precision molded version with a precision 4 fingered driver.
Figure 13:
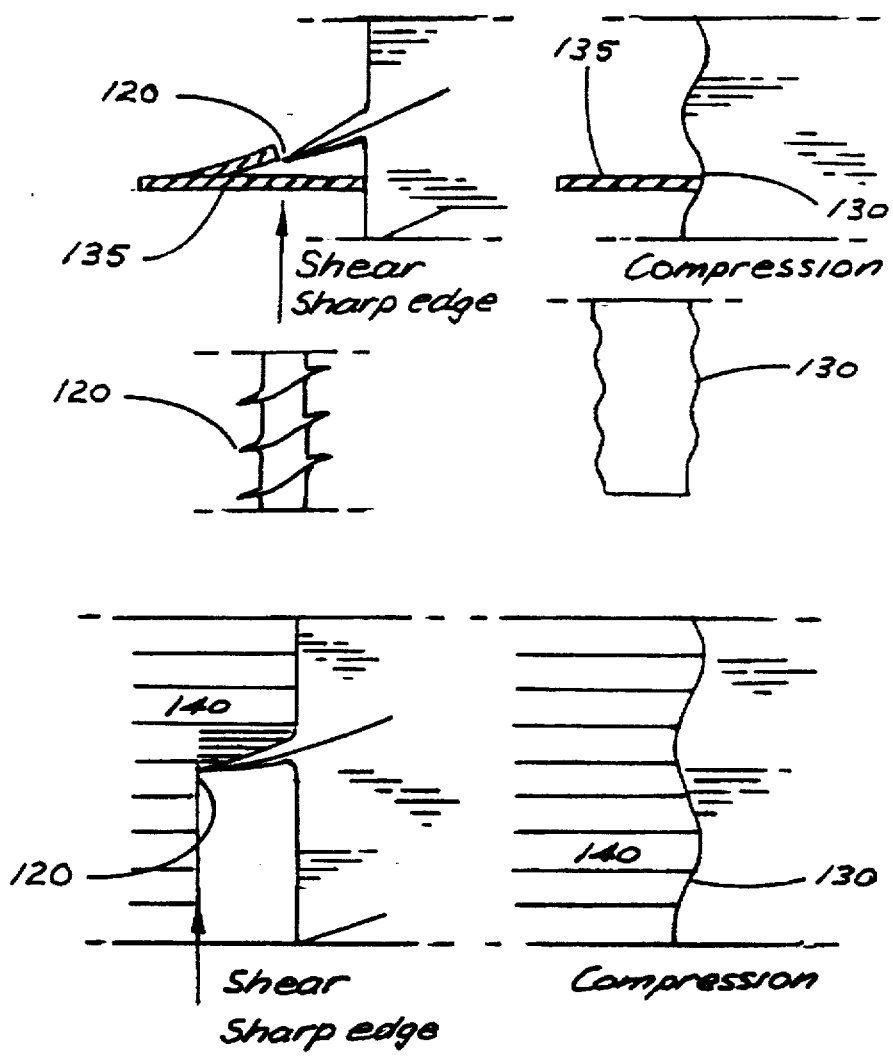
FIG. 13 is a side elevational view showing a compression of a shear and compression forcing action on fastener threads in 'sharp narrow section thread land' that cause concentrated cutting forces on the sheet metal sections causing the sharp land to shear the sheet metal one section at a time at low force, but high concentration, thereby stripping the attachment hole. This problem also applies to wood and plastic (see diagram). The tube screw has a smooth lobe type thread that causes a compression load to the whole circumference of the attachment hole. This prevents sheering forces generated by present fasteners having narrow section sharp lands.

Referring to FIG. 12 and 12a, there is shown a further embodiment of the present invention showing a lobed tubular fastener 60 having a spring action wherein the driver 62 reduces the diameter of the fastener 60 when tightening or loosening the fastener, providing a self locking action in both directions—when the driver 62 is removed. The driver 62 can have one finger or a multiplicity of fingers 78 that contact the fastener lobes 74. The fingers 78 and the lobes 74 are vertical to the diametrical centerline or acute 90 to the vertical centerline. An obtuse angle 92 would cause a radially outward force, causing the fastener 60 to tighten rather than loosen. When the driver 62 is being rotated in a clockwise direction, the driver 62 contacts lobe 74 on edge 160, the fastener 60 is reduced in diameter against radial spring tension allowing the fastener 60 to rotate. When the driver 62 rotation is stopped, the fastener 60 regains its original radial spring tension which prevents fastener 60 rotation. When the driver 62 is rotated counter-clockwise, the driver 62 contacts lobe 74 on edge 104, causing the fastener 60 to reduce in diameter, allowing the fastener 60 to rotate in a counter-clockwise direction.

FIGS. 4, 5, 6, 7, 8, 9, 14 show self drilling lobes 74 as extensions of the slot 72. These lobes are also used as driving detents for the driver 62.

Referring to FIGS. 7, 9 it can be seen that the reversible driver 62 causes a change in radial position of the edge 104 or 106, by the chordal width of the driver 62 being forced axially into the fastener 60. Referring to FIG. 7, if the driver 62 is inserted in the fastener 60 in this position, edge 104 is forced outward radially allowing edge 106 to rotate freely in a clockwise direction.

Referring to FIG. 8, if the driver 62 is reinserted at 180° to the first insertion, the long chord forces the opposite edge 106 radially outward allowing edge 104 to rotate freely in a counter-clockwise direction to facilitate removal of the fastener 60 from the work pieces 92. When the driver 62 is removed, both edges are in contact with surface 94 in the work piece 92 providing self locking of fastener 60.

Referring to FIGS. 4, 5, 6, 7, 8, 12, rotary torque is transmitted from the driver 62 to the fastener 60 by contact with detents 74 also referred to as lobes.

Referring to FIG. 5 it can be seen that the driver 62 has the optional drill point 80. This is a typical Drill/Driver referred to in the specification.

Referring to FIGS. 4, 6, the driver 62 being approximately the width of the gap 84 between the self drilling lobes, causes the edge 104 or 106 towards which the driver is rotating, to be forced out radially because of the angle 86 between the lobe face and the diametrical centerline. This angle cause a resultant force radially outward from the rotational force of the driver. The driver 62 is shown rotating in a clockwise direction.

Referring to FIG. 8, the driver 62 being approximately one-half the width of the gap between the self drilling lobes 74, changes the radial position of the edges 104 or 106 depending on which edge the driver is opposite. In a clockwise direction the driver is forcing edge 104 radially outward while transmitting rotary torque to lobe 74. This allows edge 106 to rotate freely in the work piece.

Referring to FIGS. 6, 7, 8, 9 by driving one edge 104 or 106 out radially, this edge is trailing and not digging into the work piece. Because one edge is forced out radially, the opposite edge is clear of the inside diameter of the hole in the work piece 92 and prevents the edge from digging in. This allows the fastener 60 to be rotated.

Figure 14:
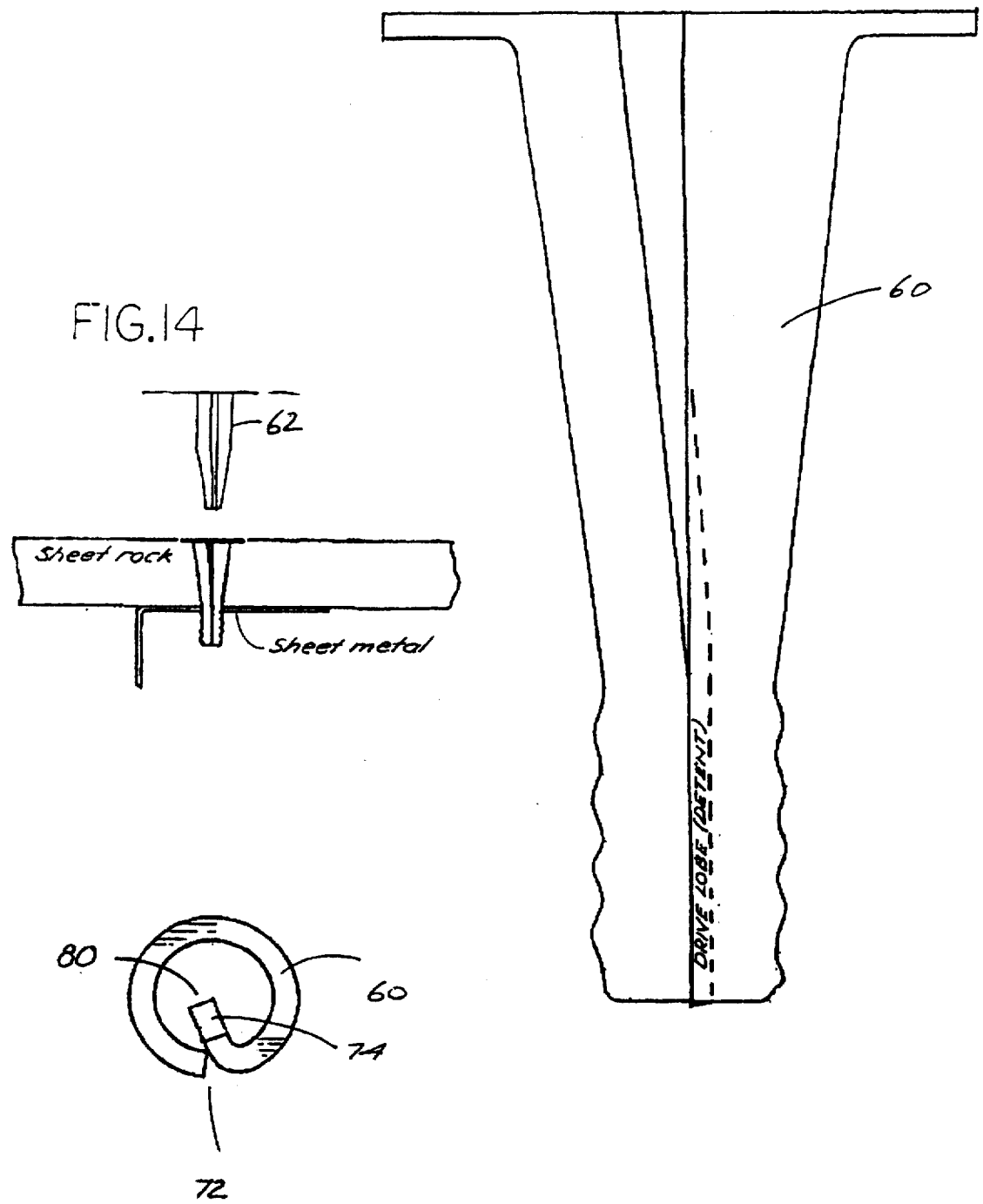
FIG. 14 is an alternate embodiment of the present invention showing a tapered shank.

Referring to FIG. 14 there is shown an alternate embodiment of the present invention showing a tapered shank.

Figure 15:
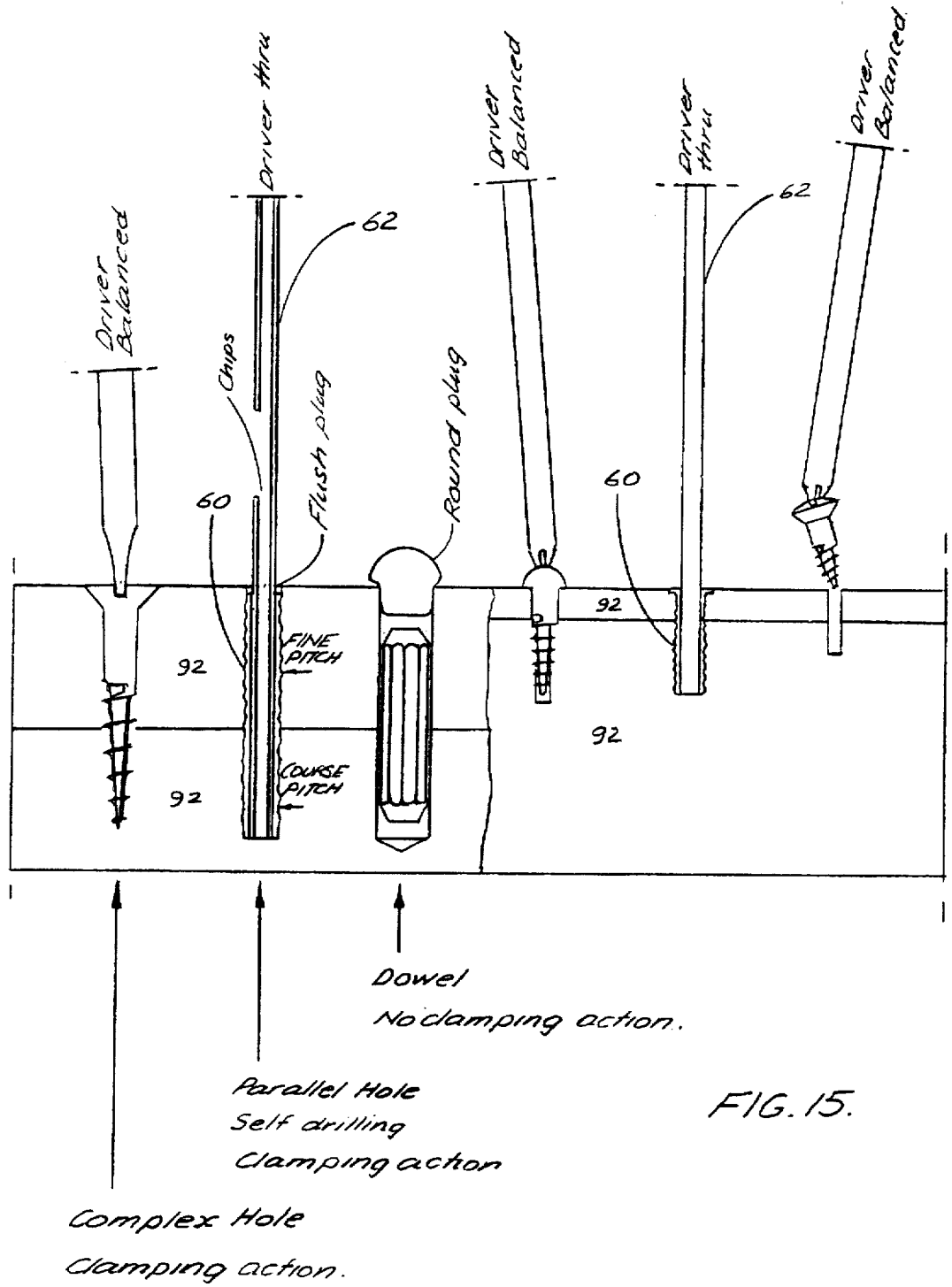
FIG. 15 is a side elevational view comparing the present invention with prior art.

Referring to FIG. 15 there is shown a side elevational view comparing the present invention with prior art.

What is claimed is:

1. A tubular fastener for fastening two or more work pieces together in combination with an internal rotary driver configured to impart torque to said fastener comprising:
   a) a hollow body of cylindrical construction having an external surface with threads formed thereon and including a slot extending longitudinally along the entire length of the said hollow body between a first edge and a second edge comprising:
      i) an elongated through bore adapted to receive said internal driver;
      ii) an engaging means for engaging said internal driver comprising a detent or multiplicity of detents;
   b) a driver means for threading said tubular fastener into apertures of a first and second work piece comprising:
      i) a torque applying means at one end, and;
      ii) an interengaging means at the other end comprising a detent engaging system and means of manipulating the first and second edges to facilitate assembly and disassembly.

2. The tubular fastener of claim 1 wherein the tubular fastener is self locking.

3. The tubular fastener of claim 1 is configured for engaging aligned openings in two work pieces for connecting said work pieces and for locking said work pieces together in a reasonable manner.

4. The tubular fastener of claim 1 wherein said body consists of a tubular casing comprising an inner and outer surface having a threaded outer surface.

5. The tubular fastener of claim 1 wherein said internal driver is configured for threaded side tubular fastener into pre-drilled apertures of the first and second work piece adapted to transfer a substantial amount of force without damage to the tubular body.

6. The threaded tubular fastener of claim 1 wherein said interengaging means comprising a plurality of edge segments for engagement with said internal driver wherein said through-bore is adapted to permit the rotary driver means to pass reciprocally through said body to engage substantially the entire length of the body for turning the tubular fastener in two axial directions, a first direction for threading and locking the tubular fastener into aligned openings, the second for backing said tubular fastener out of said openings.

7. A fastener system for connecting aperture work pieces comprising:
   a) a first work piece characterized by at least one aperture;
   b) a second work piece characterized by at least one aperture;
   c) a fastener means in combination with an internal driver for fastening the first work piece to the second work piece comprising:
      i) a hollow body of cylindrical construction having an external surface with threads formed thereon and including a slot extending longitudinally along the entire length of the said hollow body between a first edge and a second edge comprising an elongated through bore adapted to receive said internal driver; engaging means for engaging said internal driver comprising one detent or a multiplicity of detents; and d) an internal driver for threading the fastener means into the apertures of the first and second work pieces comprising;

i) a torque applying means at one end; and
ii) an interengaging means at the other end comprising one detent or a multiplicity of detents, and a means of manipulating the first edge in relation to the second edge to facilitate assembly and disassembly and self locking is employed to fasten the first work piece to the second work piece.

\* \* \* \* \*